Figure 1:
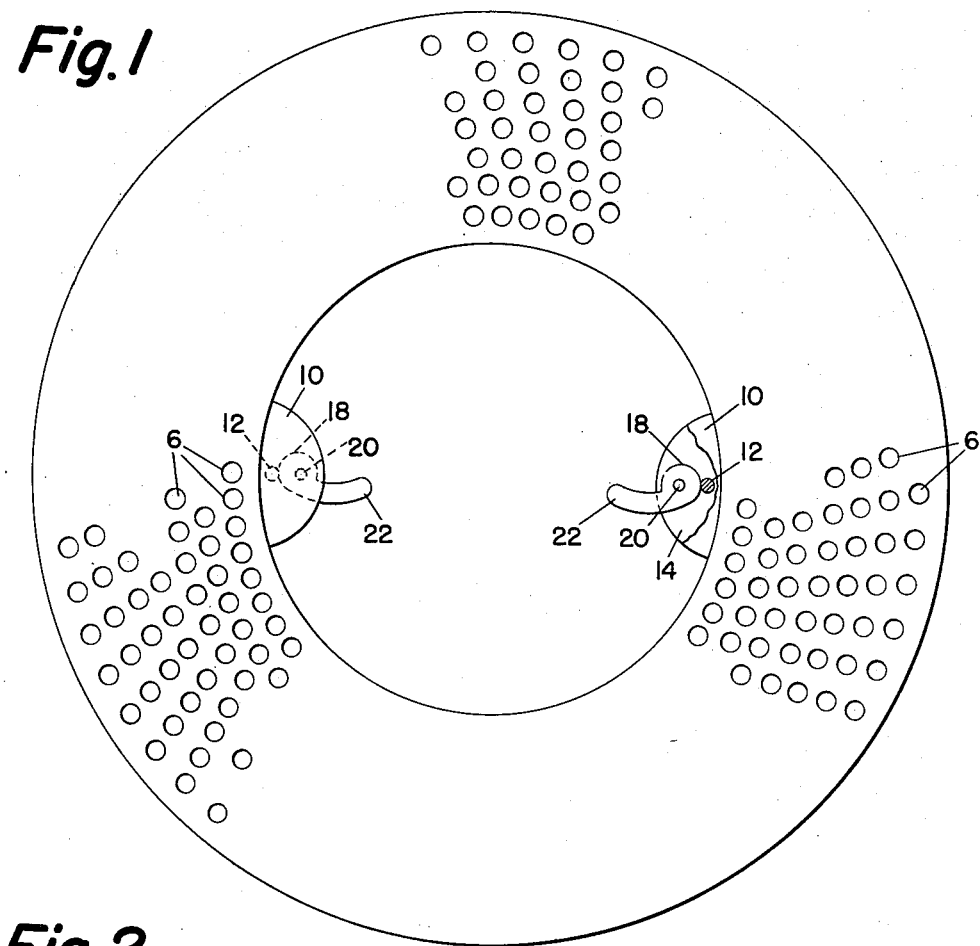

Jan. 22, 1957 R. J. BARTLETT 2,778,178
CAPSULE FILLING RING ASSEMBLY
Filed Sept. 8, 1954

INVENTOR.
RICHARD J. BARTLETT
BY
ATTORNEYS

United States Patent Office 2,778,178
Patented Jan. 22, 1957

2,778,178
CAPSULE FILLING RING ASSEMBLY

Richard J. Bartlett, Chalfonte, Pa., assignor to Smith, Kline & French Laboratories, Philadelphia, Pa., a corporation of Pennsylvania Application September 8, 1954, Serial No. 454,757

3 Claims. (Cl. 53—287)

This invention relates to a capsule filling ring assembly and, more particularly, to a pair of capsule filling rings and a locking device for holding the rings in associated relation.

In capsule closing apparatus of the type disclosed in the copending patent application of Alten E. Whitecar, Serial No. 366,188, filed July 6, 1953, there is employed a pair of rings having radially extending mating surfaces and longitudinally extending bores in each ring adapted to be in alignment with longitudinally extending bores in the other of the rings when the rings are positioned in predetermined relation with their mating surfaces in engagement with each other. The bores in one of the rings are adapted to hold capsule bodies and the bores in the other of the rings are adapted to hold capsule caps. With the rings disassembled and the capsule body retaining ring filled with capsules, a material with which the capsules are to be filled is spread over the surface of the capsule body retaining ring, filling the capsules therein. After the capsule bodies are thus filled, the capsule cap retaining ring is placed over the capsule body retaining ring with the radially extending mating surfaces of the two rings being in engagement with each other and the bores in one of the rings containing the capsule bodies being in alignment with the bores in the other of the rings containing capsule caps. With the two rings held in this position, the two rings are placed upon a capsule closing apparatus. This apparatus need not be set forth herein, it being sufficient to note that any movement between the mating surfaces would give rise to spilling of the material from the capsule body which would cause the material to enter between the two rings, displacing the rings, reducing the amount of material contained within the closed capsule, and adversely affecting the closure of the capsules due to the fact that the two rings have been displaced with respect to one another.

It is the object of this invention to provide a capsule filling ring assembly which includes means for releasably locking two rings together in order that the rings cannot be displaced after they have been positioned with their radially extending mating surfaces in engagement with each other and during the transportation of the rings from the position in which they are assembled to the position in which the capsule contained within the ring are to be closed.

It is a further object of the invention to provide means whereby capsule filling rings may be locked together by compression of an operator's fingers while holding the rings and in which the locks may be subsequently released by compression of the operator's fingers.

Figure 2:
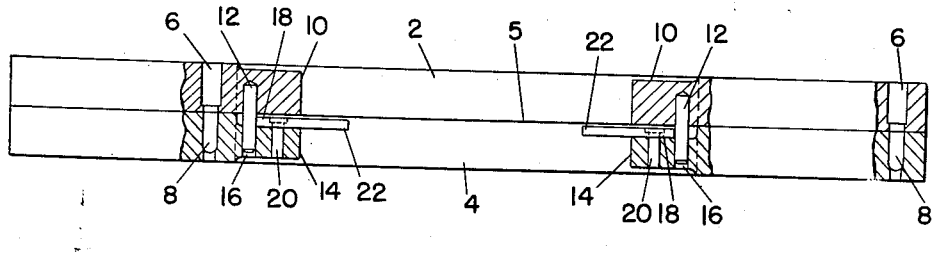

These and other objects of the invention will become apparent from the following description when read in conjunction with the accompanying drawing in which:

Figure 1 is a partially cut-away plan view of the capsule filling ring assembly; and Figure 2 is an elevation partly in section of the ring assembly shown in Figure 1.

The capsule filling ring assembly includes a ring 2 and a ring 4 having radially extending mating faces 5. The ring 2 is provided with a plurality of capsule cap receiving bores 6. The ring 4 is provided with a plurality of capsule body receiving bores 8. The ring 2 is provided with a pair of radially inwardly extending portions 10. Each of the portions 10 mounts a pin 12 which extends toward the ring 4. The ring 4 is provided with a pair of radially inwardly extending portions 14 each of which is provided with a bore 16 adapted to receive the pin 12 in the corresponding portion 10 of the ring 2.

Each of the inwardly extending portions 14 mounts a pin 20 on which there is rotatably positioned a cam member 18. Each of the cam members 18 is provided with a radially inwardly extending lever portion 22 and has a radially outwardly positioned cam surface adapted to engage the pin 12 mounted in the inwardly extending portion 10 of the ring 2 which is adjacent thereto. Thus motion of the lever end 22 in a downward direction, as viewed in Figure 1, will cause the surfaces of the cam 18 which are pivotally mounted on the ring 4 to engage the pin 12 positioned adjacent thereto and mounted on the ring 2. With the cams and the pins thus locked together, the two rings 2 and 4 cannot be separated. When it is desired to separate the rings, the lever ends 22 of the cam members are both moved upwardly, as viewed in Figure 1, rotating the cams so as to disengage the surfaces of the cams from their associated pins and thus permitting motion between the rings 2 and 4.

It will be evident from the foregoing that the invention provides a simple yet highly practical means for locking together a pair of capsule filling rings during their transportation from the station in which the rings are positioned with their mating surfaces in engagement with each other and with the capsule caps and bodies in proper alignment to the position in which the capsule bodies are pressed upwardly into the capsule caps in the capsule closing operation. The rings are of such a size that they may be conveniently grasped by an operator and an operator holding the rings can pull the two levers 22 downwardly, as viewed in Figure 1, by compression of the fingers and thus lock the two rings together and, after the rings are positioned in the capsule closing apparatus, the operator by gripping the upper half of the rings with his hands can draw the levers 22 upwardly with his thumbs, thus releasing the clamping means and freeing the two rings for motion with respect to each other. It will be evident that various modifications may be made to the embodiment of the invention disclosed herein without departing from the scope of the invention as set forth in the following claims.

What is claimed is:

1. A capsule filling ring assembly comprising a pair of rings having radially extending mating surfaces, means including a pair of pins mounted in one of said rings and a pair of bores for receiving said pins in the other of said rings for positioning said rings in predetermined relative positions with their mating surfaces in engagement with each other, a plurality of longitudinally extending bores in each of said rings positioned in alignment with the bores in the other of said rings when the rings are in said predetermined relative positions, the bores in one of said rings being adapted to hold capsule bodies and the bores in the other of said rings being adapted to hold capsule caps, and cam means engageable with said pins for releasably locking said rings in said predetermined relative positions.

2. A capsule filling ring assembly comprising a pair of rings having radially extending mating surfaces, each of said rings including a pair of radially inwardly extending portions, means comprising pins mounted in each of said inwardly extending portions of one of said rings and receiving bores therefor in the inwardly extending portions of the other of said rings for positioning said rings in predetermined relative positions with their mating surfaces in engagement with each other, a plurality of longitudinally extending bores in each of said rings positioned in alignment with the bores in the other of said rings when the rings are in said predetermined relative positions, the bores in one of said rings being adapted to hold capsule bodies and the bores in the other of said rings being adapted to hold capsule caps, and releasable means including a pair of lever operated cam members engageable with said pins for locking said rings in said predetermined relative positions, said levers each being mounted on said bored inwardly extending ring portions and extending radially inwardly of said inwardly extending ring portions.

3. A capsule filling ring assembly comprising a pair of rings having radially extending mating surfaces, each of said rings including a pair of radially inwardly extending portions, means comprising pins mounted in each of said inwardly extending portions of one of said rings and receiving bores therefor in the inwardly extending portions of the other of said rings for positioning said rings in predetermined relative positions with their mating surfaces in engagement with each other, a plurality of longitudinally extending bores in each of said rings positioned in alignment with the bores in the other of said rings when the rings are in said predetermined relative positions, the bores in one of said rings being adapted to hold capsule bodies and the bores in the other of said rings being adapted to hold capsule caps, and releasable means including a pair of lever operated cam members engageable with said pins for locking said rings in said predetermined relative positions, said levers each being mounted on said bored inwardly extending ring portions and extending radially inwardly of said inwardly extending ring portions, and said cams being positioned to engage said pins upon movement of both of said levers in one direction and to disengage said pins upon movement of both of said levers in the opposite direction.

References Cited in the file of this patent

UNITED STATES PATENTS

| | | |
|---|---|---|
| 693,637 | Brethour | Feb. 18, 1902 |
| 1,073,286 | Remington | Sept. 16, 1913 |
| 1,545,777 | Kath et al. | July 14, 1925 |